US005286546A

United States Patent [19]

Su

[11] Patent Number: 5,286,546

[45] Date of Patent: Feb. 15, 1994

[54] POSITION MARKING AND EASY TEARING-OFF FOR SELF-STICK REMOVABLE NOTE PAD OR SIMILAR DEVICES

[76] Inventor: Ping-Yao Su, 152-18 Union Tpke., Flushing, N.Y. 11367

[21] Appl. No.: 919,611

[22] Filed: Jul. 24, 1992

Related U.S. Application Data

[63] Continuation of Ser. No. 776,608, Oct. 10, 1991, abandoned.

[51] Int. Cl.$^5$ .......................... B32B 7/12; B32B 7/14; B32B 29/00

[52] U.S. Cl. .................................... 428/194; 428/192; 428/343; 428/40; 428/42; 428/77; 428/81; 428/84; 283/63.1; 281/15.1

[58] Field of Search ................. 428/194, 192, 343, 40, 428/42, 84, 81, 77; 283/63.1; 281/15.1

[56] References Cited

U.S. PATENT DOCUMENTS

| | | | |
|---|---|---|---|
| 2,724,601 | 11/1955 | Fuerst et al. | 428/194 X |
| 3,922,464 | 11/1975 | Silver et al. | 428/355 |
| 4,105,224 | 8/1978 | Rodebaugh et al. | 428/194 X |
| 4,447,481 | 5/1984 | Holmberg et al. | 428/194 X |
| 4,590,109 | 5/1986 | Holmberg | 428/194 X |
| 4,714,276 | 12/1987 | Greig | 428/194 X |
| 4,842,919 | 6/1989 | David et al. | 428/40 |
| 4,946,728 | 8/1990 | Ikeda et al. | 428/84 X |
| 4,980,212 | 12/1990 | Marquis et al. | 428/194 X |
| 5,153,041 | 10/1992 | Clements et al. | 428/194 X |

*Primary Examiner*—Daniel Zirker

*Attorney, Agent, or Firm*—Dara L. Onofrio; Glenn F. Ostrager

[57] ABSTRACT

An improved note pad device is disclosed comprised of a plurality of sheets arranged in overlying and coextensive relation, wherein each of the sheets has a top, bottom and side edges, a means for removably binding said sheets at the top edges to form a bound pad, and a position means for identifying the position of the bottom edge of each of the sheets to facilitate successive removal of each of the sheets from the bound pad. In a preferred embodiment of the invention the position means comprises a diagonal edge cut in each of the sheets on the intersection of at least one of the side edges and bottom edge. Alternatively, the position means may comprise diagonal edge cuts at opposing sides of the note pad located at the intersection of each of the side edges and bottom edge. In another embodiment the position means comprises a backing sheet which underlies and is bound to the plurality of sheets. The backing sheet has a depending edge section that has a widthwise dimension outboard of the bottom edge which is approximately equal to the height of the cross section of the plurality of sheets. In other alternative embodiments the position means comprises a line or minute hole at midpoint across the frontal portion of the top edge of each of the sheets. In all the embodiments of the invention the position means readily permits the user of the note pad to identify the bottom edge of the note pad to facilitate easy tearing off of sheets of the note pad from one another.

5 Claims, 3 Drawing Sheets

POSITION MARKING AND EASY TEARING-OFF FOR SELF-STICK REMOVABLE NOTE PAD OR SIMILAR DEVICES

This is a continuation of copending application Ser. No. 07/776,608 filed on Oct. 10, 1991, now abandoned.

DESCRIPTION

1. Field of Invention

The present invention relates, generally, to an improved note pad device which readily permits the user of the note pad to identify the bottom edge of the note pad and, simultaneously, allows the user to easily remove sheets of the note pad from one another.

More particularly, the present invention relates to an improved removable note pad device with position orientation markings for identifying the bottom edge of the note pad to facilitate easy tearing off of individual sheets of the note pad from one another.

2. Background Art

Removable note pads are known in the prior art. As an example, U.S. Pat. No. 3,922,464 to Silver et al. discloses a removable, pressure-sensitive adhesive for use in such a pad, which is commercially marketed under the trademark "POST-IT" by the Minnesota Mining and Manufacturing Company ("3M"), St. Paul, Minnesota, U.S.A.. The "POST-IT" note pad article and other generic self-stick removable note pads, of a scratch, or plain, paper type, do not indicate to or show the user of the pad which side of the sheets contain the adhesive to allow the user to apply and remove a sheet to and from other surfaces. In addition, these note pads do not indicate which side or corners the user should remove the sheets from the note pad, often causing unnecessary personal inconvenience and minor irritation to the user in the office or at home.

These disadvantages and drawbacks in the use of known self-stick removable note pads is universally observed and encountered. Generally, consumers use self-stick note pads by placing the note pad at some point on a surface, notably a letter or document, writing down on the top sheet, then removing the top sheet from the pad, and attaching it to a suitable place, usually at the top of the letter or document. Convenience necessitates this method, as consumers prefer to move the pad around on a surface while writing.

It is during or after this process that people often encounter some minor disappointment or even frustration as they manage to remove a sheet from the pad after finishing their writing — only to find that they wrote on the wrong side with the glued edge on the bottom. The prior art has attempted to overcome this problem by providing trays for holding the note pads. However, all these trays can do is simply hold a note pad in the right position for the user with no assurance of keeping it in the proper position all the time. These trays do not provide position markings which indicate the top or bottom edges of the pad to identify the unglued edge of the note pad from the glued portion. Further, users often pull out more than one sheet at a time and are forced to put them back into the tray — which is a somewhat difficult and messy task.

Therefore, known methods are not entirely satisfactory in that present self-stick note pads do not include position markers. There is a need in the art for self-stick note pad devices which readily permit the user of the note pad to identify the top and bottom edges of the pad and simultaneously allow the user to easily remove sheets of the note pad from one another. This invention is directed to the provision of such note pad devices which have wide range applications in creating note pads with a variety of position markers.

Accordingly, it is a broad object of the invention to provide a note pad device comprised of a plurality of sheets, each sheet having top, bottom and side edges, a means for removably binding the sheets at the top edges to form a bound pad and a position means which readily permits the user to identify the bottom edge of the note pad and to allow the user to easily remove sheets of the note pad from one another.

A specific object of the invention is to provide an improved note pad device with a position means comprising a diagonal edge cut in each of the sheets of the note pad on the intersection of at least one of the side edges and bottom edge.

Another specific object of the invention is to provide an improved self-stick note pad device with a position means comprising a backing sheet which underlies and is bound to the plurality of sheets, having a depending edge section that has a widthwise dimension outboard of the bottom edge which is approximately equal to the height of the cross section of the plurality of sheets.

A further specific object of the invention is to provide an improved self-stick note pad device with a position means comprising a line, preferably in color, across the frontal portion of the top edge of each of the sheets of the note pad.

Another further object of the invention is to provide an improved self-stick note pad device with a position means comprising a minute hole at midpoint across the frontal portion of the top edge of each of the sheets of the note pad.

DISCLOSURE OF INVENTION

In the present invention, these purposes as well as others which will be apparent are achieved generally by providing note pad devices which readily permit the user of the note pad to identify the bottom edge of the note pad and simultaneously allows the user to easily remove individual sheets of the note pad from one another.

The invention provides a note pad comprised of a plurality of sheets arranged in overlying and coextensive relation, wherein each of the sheets has a top, bottom and side edges, a means for removably binding the sheets at the top edges to form a bound pad, and a position means for identifying the position of the bottom edge of the pad for sheet removal.

In a preferred embodiment of the invention the position means comprises a diagonal edge cut in each of the sheets on the intersection of at least one of the side edges and bottom edge. Alternatively, the position means may comprise diagonal edge cuts at opposing sides of the note pad located at the intersection of each of the side edges and bottom edge. To further assist the user in the removal of individual sheets from the note pad the diagonal edge cut may be arranged in overlying relation to form an inwardly slanted beveled corner.

In another embodiment the position means comprises a backing sheet which underlies and is bound to the plurality of sheets. The backing sheet has a depending edge section that has a widthwise dimension outboard of the bottom edge which is approximately equal to the height of the cross section of the plurality of sheets. In other alternative embodiments the position means comprises a line or minute hole at midpoint across the frontal portion of the top edge of each of the sheets. In all the embodiments of the invention the position means readily permits the user of the note pad to identify the bottom edge of the note pad and facilitates easy tearing off of individual sheets of the note pad from one another.

The sheets of the note pad, in a preferred embodiment, have a rectangular configuration, but the invention is not limited to this configuration and may encompass other shapes.

A preferred means for removably binding the sheets at the top edges comprises a pressure-sensitive adhesive. However, the means for removably binding the sheets of the note pad together can be accomplished by other methods.

Other objects and features of the present invention will become apparent when the detailed description of the preferred embodiments of the invention are considered in conjunction with the drawings. It should, however, be understood that the drawings are intended to illustrate certain preferred embodiments of the present invention and are not intended as a means for defining the limits and scope of the invention.

DETAILED DESCRIPTION OF THE PREFERRED EMBODIMENTS

Figure 1:
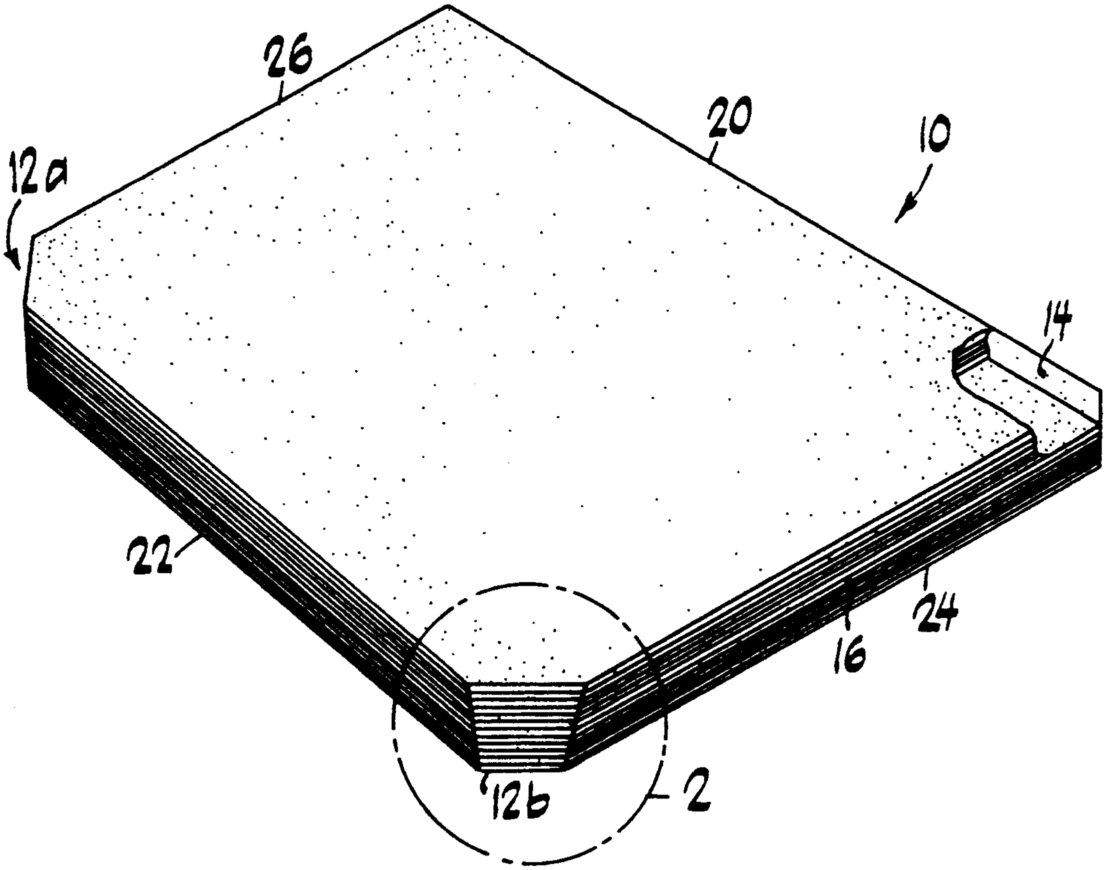
FIG. 1 shows a perspective view of a note pad with position means comprising diagonal edge cuts at opposing sides of the note pad, with a portion of the note pad sheets being broken away in order to allow a view of the backing of the pad along the side having the adhesive.

With further reference to the drawings, FIG. 1 shows a perspective view of a preferred embodiment of the invention. In general, the present invention provides a note pad 10 comprising a plurality of sheets arranged in overlying and coextensive relation, wherein each of said sheets 16 has top 20, bottom 22 and side edges 24, 26, a means for removably binding the sheets at the top edges to form a bound pad 14, and a position means for identifying the position of the bottom edge of each of the sheet and for facilitating successive removal of each of the sheets from the bound pad.

In a preferred embodiment the position means comprises a diagonal edge cut in each of the sheets 16. The diagonal edge cut is defined by the intersection of at least one of the side edges 24, 26 and the bottom edge 22. The position means serve as an easily identifiable mark for the bottom edge 22 of the pad and simultaneously provide greater ease in the removal of sheets from one another.

Figure 2:
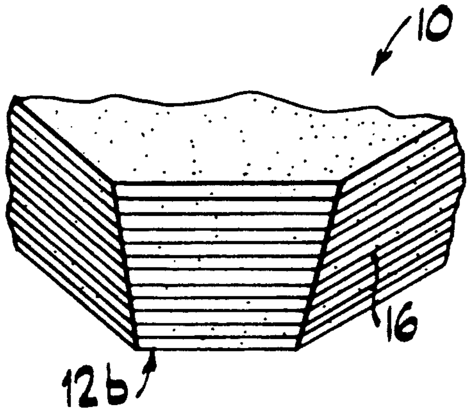
FIG. 2 illustrates an enlarged, perspective view of the note pad as shown within the broken-lined circle 2, of FIG. 1.
Figure 3:
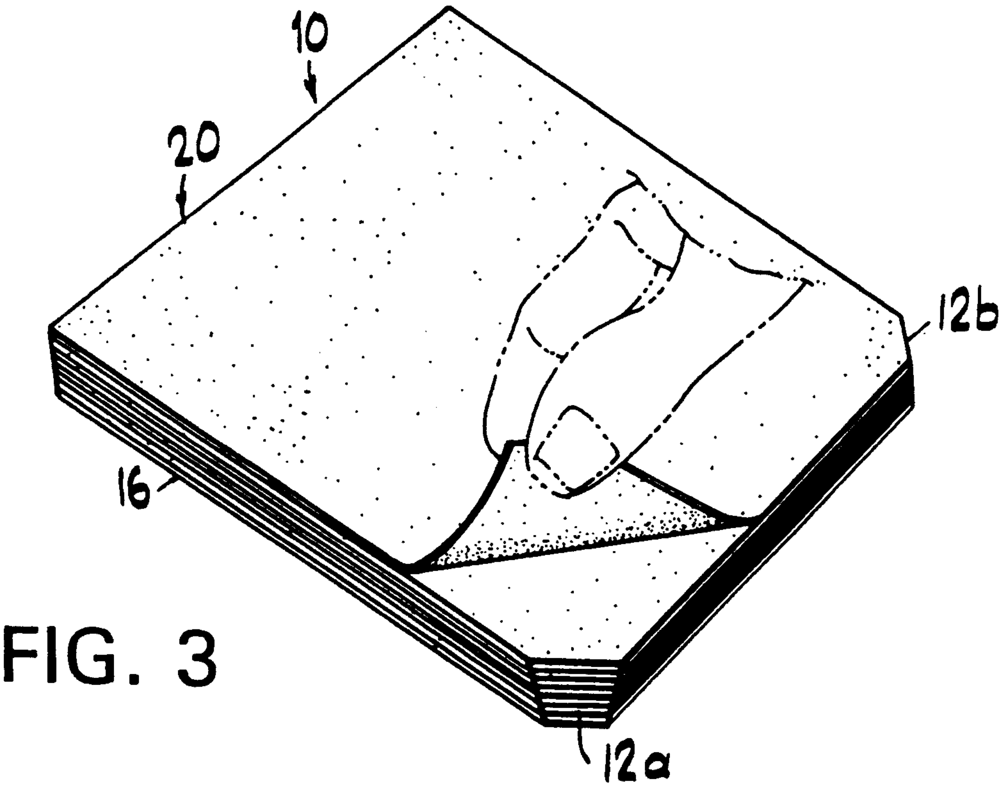
FIG. 3 shows a perspective view of the note pad of FIG. 1, with the hand of a user utilizing one of the corners in order to easily remove a sheet of paper.

As shown in FIG. 1 the note pad 10 has position means comprising two diagonal edge cuts 12*a*, 12*b* at opposing sides of the pad located at the intersection of each of the side edges 24, 26 and the bottom edge 22. The diagonal edge cut in each of the sheets 16 is arranged in overlying relation, and forms an inwardly slanted beveled corner in the pad as illustrated in FIG. 2. This position means further assists the user in easy removal of individual sheets 16 as demonstrated in FIG. 3. FIG. 3 shows a perspective view of the note pad 10, with the hand of a user utilizing one of the corners in order to easily remove a sheet of paper.

In FIG. 1 a portion of the note pad sheets 16 have been removed to view the means for removably binding the sheets at the top edges to form the bound pad 14. The means for removably binding the sheets may comprise a pressure-sensitive adhesive; however, other means may be employed to hold the sheets of the note pad together.

The sheets of the note pad, in preferred embodiments, have a rectangular configuration, but the invention is not limited to this configuration and may encompass other shapes.

Figure 4:
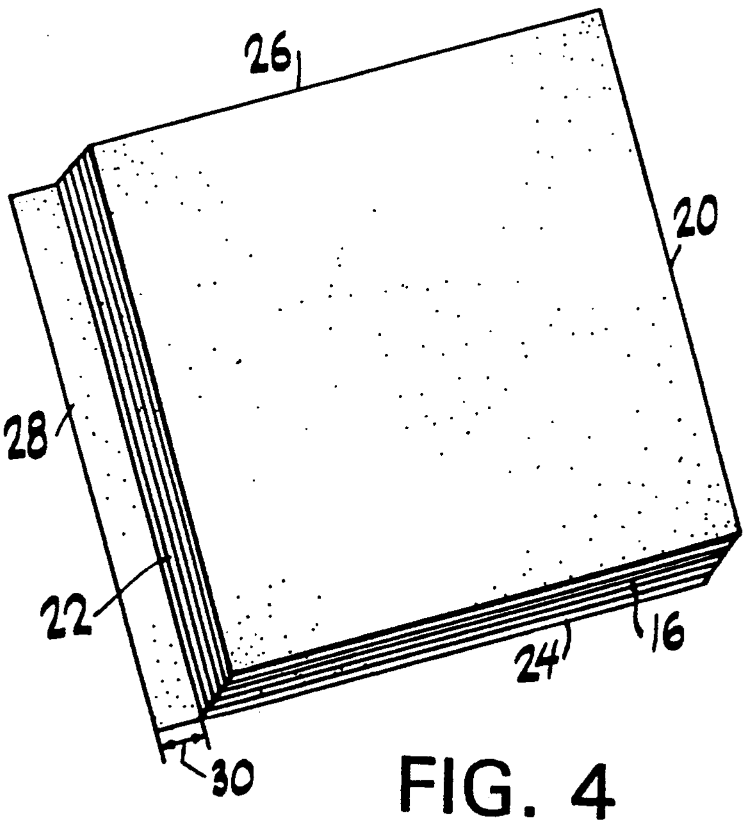
FIG. 4 illustrates an alternative embodiment of the present invention wherein the position means is a backing sheet which underlies and is bound to the plurality of sheets.

FIG. 4 illustrates an alternative embodiment of the present invention wherein the position means is a backing sheet 28 which underlies and is bound to the plurality of sheets. The backing sheet 28 has a depending edge section 30 which extends outwardly from the bottom edge 22 of the plurality of sheets. This depending edge section indicates to the user the bottom edge of the note pad for sheet removal. Preferably the depending edge section 30 has a widthwise dimension aboard of the bottom edge 22 which is approximately equal to the height of the cross section of the plurality of sheets.

When the note pad is packaged the depending edge section is "folded up" so there is a snug wrapping. When the package is opened for use the depending edge section 30 falls flat, thereby serving as a means for identifying the bottom edge of the note pad for sheet removal from the note pad.

Figure 5:
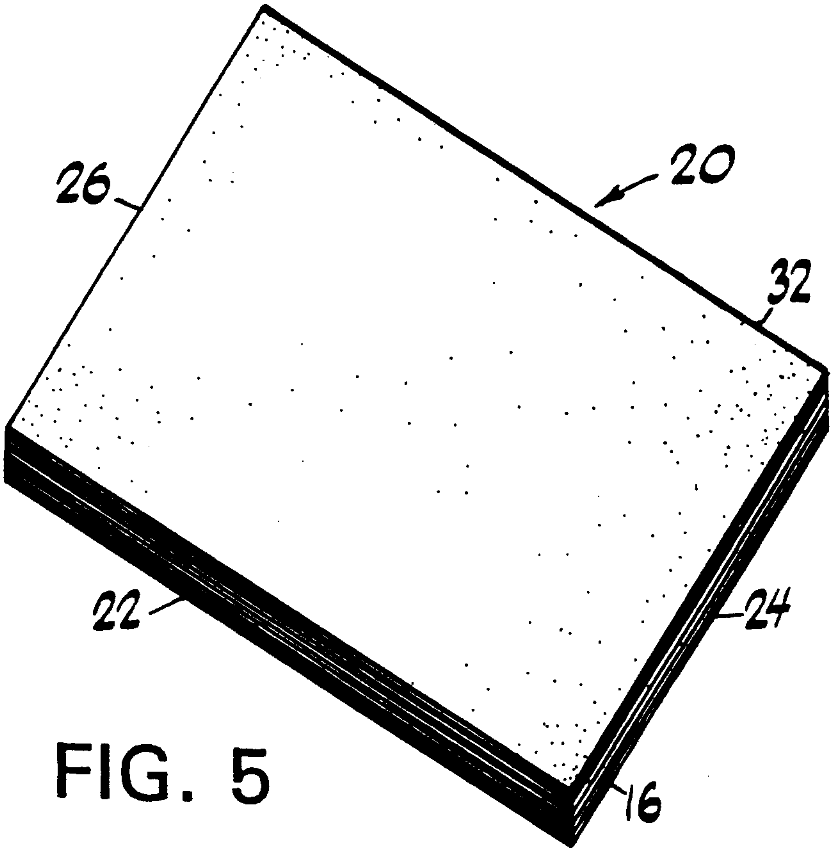
FIG. 5 illustrates an alternative embodiment of the present invention wherein the position means is a line across the frontal portion of the top edge of the note pad.
Figure 6:
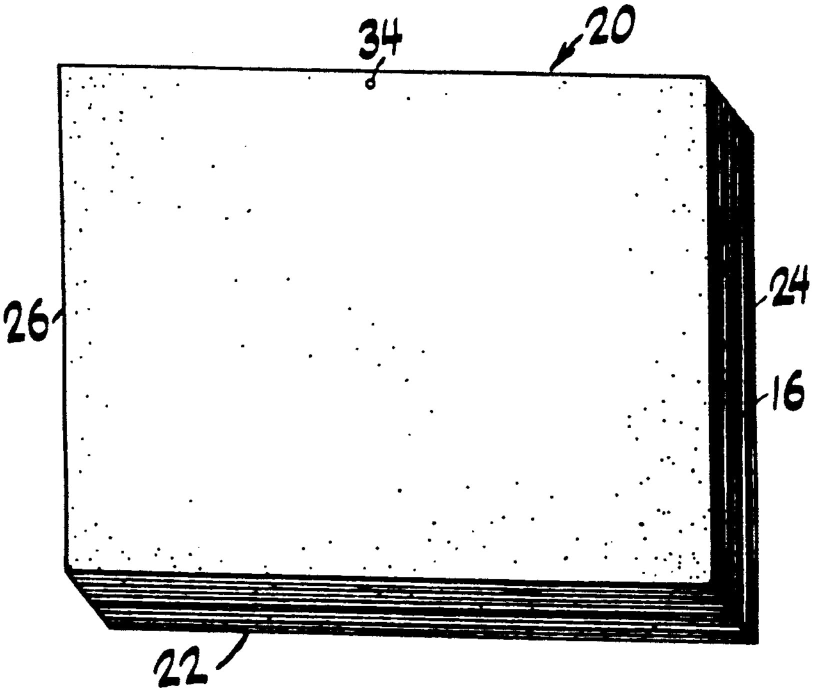
FIG. 6 illustrates an alternative embodiment of the present invention wherein the position means is a minute hole at midpoint across the frontal portion of the top edge of the note pad.

In other alternative embodiments of the invention, the position means comprises a line 32 or minute hole 34 across the frontal portion of the top edge of each of the sheets. See FIGS. 5 and 6 respectively. The minute hole 34 is preferably midpoint across the frontal portion of the top edge of each of the sheets and is visible to the naked eye. The line 32 is preferably in red or black but can be any color. In both embodiments the position means assist the user in identifying the bottom edge of the note pad for removal of the individual sheets.

Therefore, although the invention has been described with reference to certain preferred embodiments, it will be appreciated that other position means, composite structures and modifications of the present invention may be devised, which are nevertheless within the scope and spirit of the invention as defined in the claims appended hereto.

I claim:

1. A note pad comprising:

a plurality of sheets arranged in overlying and coextensive relation, each of said sheets having top, bottom and side edges, means for removably binding said sheets only at the back side of said top edges of each of said sheets to form a bound pad, wherein said means for removably binding said sheets comprises a pressure-sensitive adhesive; and position means for identifying the position of said bottom edge of each of said sheets, each of which is non-adhesive backed, to facilitate successive removal of each of said sheets from the bound pad;

wherein said position means comprises a diagonal edge cut in each of said sheets arranged in overlying relation with respect to each of said plurality of sheets and forms an inwardly slanted beveled corner in the pad, wherein said diagonal cut edge is defined by the intersection of at least one of said side edges and said bottom edge;

such that said bottom edge of the note pad is readily identifiable and said diagonal cut edge is of a size such that the thumb of a user of the note pad can easily remove each of said sheets from one another.

2. A note pad according to claim 1, wherein said diagonal edge cut is located at opposing sides of the pad defined by the intersection of each of said side edges and said bottom edge and forms inwardly slanted beveled corners in the pad.

3. A note pad comprising:

a plurality of sheets arranged in overlying and coextensive relation, each of said sheets having top, bottom and side edges, means for removably binding said sheets only at the back side of said top edges of each of said sheets to form a bound pad, wherein said means for removably binding said sheets comprises a pressure-sensitive adhesive; and position means for identifying the position of said bottom edge of each of said sheets, each of which is non-adhesive backed, to facilitate successive removal of each of said sheets from the bound pad;

wherein said position means comprises both a minute hole, visible to the naked eye, located midpoint across the frontal portion of said top edge in each of said sheets, and also a flexible backing sheet which underlies and is bound to said plurality of sheets, said backing sheet having a depending edge section which extends outwardly from said bottom edge of the plurality of sheets;

wherein the pad has a height defined by the dimensional cross section of said plurality of sheets, and said depending edge section has a widthwise dimension outboard of said bottom edge which is approximately equal to said height dimension;

such that when the note pad is packaged said depending edge section is folded up so there is a snug wrapping and when the package is opened for use said depending edge section falls flat so that said bottom edge of the note pad is readily identifiable;

thereby each position means permitting the user to readily identify said bottom edge of the note pad to allow easy removal of each of said sheets from one another.

4. A note pad comprising:

a plurality of sheets arranged in overlying and coextensive relation, each of said sheets having top, bottom and side edges, means for removably binding said sheets only at the back side of said top edges of each of said sheets to form a bound pad, wherein said means for removably binding said sheets comprises a pressure-sensitive adhesive; and position means for identifying the position of said bottom edge of each of said sheets, each of which is non-adhesive backed, to facilitate successive removal of each of said sheets from the bound pad;

wherein said position means comprises a colored line across the frontal portion of said top edge in each of said sheets which distinguishes said top and bottom edges from said side edges respectively, and permits the user to identify said bottom edge of the note pad to allow easy removal of each of said sheets from one another.

5. A note pad comprising:

a plurality of sheets arranged in overlying and coextensive relation, each of said sheets having top, bottom and side edges, means of removably binding said sheets only at the back side of said top edges of each of said sheets to form a bound pad, wherein said means for removably binding said sheets comprises a pressure-sensitive adhesive; and position means for identifying the position of said bottom edge of each of said sheets, each of which is non-adhesive backed, to facilitate successive removal of each of said sheets from the bound pad;

wherein said position means comprises a minute hole, visible to the naked eye, located midpoint across the frontal portion of said top edge in each of said sheets which permits the user to identify said bottom edge of the note pad to allow easy removal of each of said sheets from one another.

* * * * *